(12) United States Patent
Bichler et al.

(10) Patent No.: US 10,793,774 B2
(45) Date of Patent: Oct. 6, 2020

(54) PHOSPHOR, METHOD FOR PRODUCING A PHOSPHOR AND USE OF A PHOSPHOR

(71) Applicant: OSRAM OLED GMBH, Regensburg (DE)

(72) Inventors: Daniel Bichler, Augsburg (DE); Christian Koch, Oberottmarshausen (DE); Johanna Strube-Knyrim, Weil (DE)

(73) Assignee: OSRAM OLED GMBH, Regensburg (DE)

( * ) Notice: Subject to any disclaimer, the term of this patent is extended or adjusted under 35 U.S.C. 154(b) by 324 days.

(21) Appl. No.: 15/738,058

(22) PCT Filed: Jun. 22, 2016

(86) PCT No.: PCT/EP2016/064464
§ 371 (c)(1),
(2) Date: Dec. 19, 2017

(87) PCT Pub. No.: WO2016/207244
PCT Pub. Date: Dec. 29, 2016

(65) Prior Publication Data
US 2018/0305613 A1    Oct. 25, 2018

(30) Foreign Application Priority Data

Jun. 25, 2015    (DE) .................. 10 2015 110 258

(51) Int. Cl.
C09K 11/77    (2006.01)
C01F 17/30    (2020.01)

(52) U.S. Cl.
CPC .......... C09K 11/7721 (2013.01); C01F 17/30 (2020.01); *C01P 2002/72* (2013.01); *C01P 2002/84* (2013.01)

(58) Field of Classification Search
CPC ................................................ C09K 11/7721
See application file for complete search history.

(56) References Cited

U.S. PATENT DOCUMENTS

| 7,094,362 B2 | 8/2006 | Setlur et al. |
| 8,920,676 B2 | 12/2014 | Cheetham et al. |
| 2006/0197439 A1 | 9/2006 | Sakane et al. |
| 2007/0075629 A1 | 4/2007 | Le Toquin et al. |
| 2009/0033201 A1 | 2/2009 | Shimooka et al. |
| 2009/0066230 A1 | 3/2009 | Hirosaki et al. |
| 2009/0236963 A1 | 9/2009 | Nagatomi et al. |
| 2011/0186778 A1 | 8/2011 | Becker et al. |
| 2011/0279017 A1 | 11/2011 | Li et al. |
| 2012/0019126 A1 | 1/2012 | Porob et al. |
| 2014/0265819 A1 | 9/2014 | Albessard et al. |
| 2015/0049456 A1 | 2/2015 | Hoehmann et al. |
| 2016/0178141 A1 | 6/2016 | Bichler |

FOREIGN PATENT DOCUMENTS

| DE | 10146719 A1 | 4/2003 |
| WO | 2007041563 A2 | 4/2007 |
| WO | 2011098164 A1 | 8/2011 |
| WO | 2012076296 A2 | 6/2012 |
| WO | 2013110495 A2 | 8/2013 |
| WO | 2014019758 A1 | 2/2014 |

OTHER PUBLICATIONS

Hick S. M. et al.: "Synthesis and Crystal Structure of Cubic Ca16Si17N34" Inorganic Chemistry, 51, 2012, pp. 12626-12629.
Kawano Y. et al.: "Site engineering concept of Ce3+-activated novel orange-red emission oxide phosphors" Optical Materials Express, vol. 4, No. 9, Sep. 1, 2014, pp. 1770-1774.
Le Toquin R. et al.: "Red-emitting ceriumbased phosphor materials for solid-state lighting applications" Chemical Physics Letters, 423, 2006, pp. 352-356.
Setlur A. A. et al.: "Crystal Chemistry and Luminescence of Ce3+-Doped Lu2CaMg2(Si,Ge)3O12 and Its Use in LED Based Lighting" Chem. Mater., vol. 18, No. 14, 2006, pp. 3314-3322.

*Primary Examiner* — C Melissa Koslow
(74) *Attorney, Agent, or Firm* — Arent Fox, LLP

(57) ABSTRACT

The invention relates to a red-emitting luminescent material of the formula $AE_{16-x}Ce_xSi_{17-z}Al_zN_{32+y-z}O_{2-y+z}$ wherein AE=Mg, Ca, Sr and/or Ba, $0<x\leq2$, $0\leq y<5$, $0\leq z\leq3$ and $y+z<2$.

9 Claims, 10 Drawing Sheets

FIG 1b

Figure 1A:
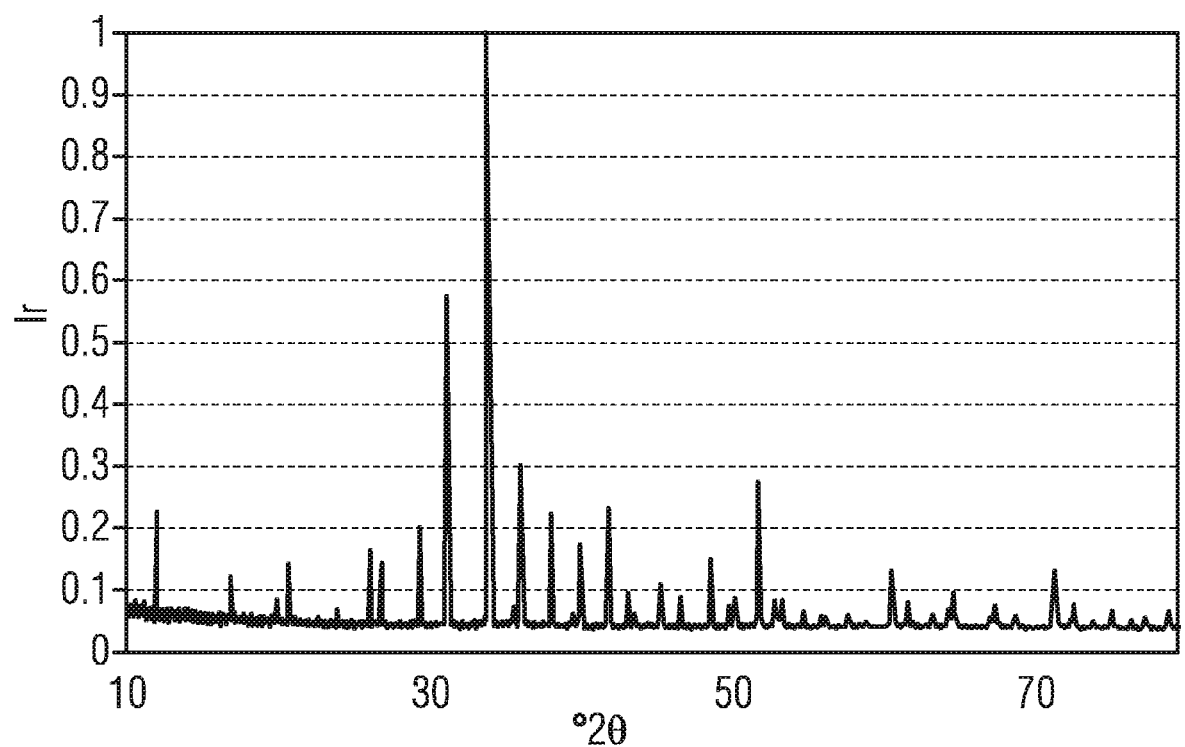

| nr. | pos. [°2θ] | d-distance [Å] | h | k | l | multiplicity | relative intensity [%] |
|---|---|---|---|---|---|---|---|
| 1 | 10.31 | 8.575 | 1 | 1 | 1 | 8 | 3.2 |
| 2 | 11.90 | 7.428 | 0 | 2 | 0 | 6 | 18.7 |
| 3 | 16.86 | 5.254 | 0 | 2 | 2 | 12 | 8.0 |
| 4 | 19.79 | 4.482 | 1 | 3 | 1 | 24 | 3.6 |
| 5 | 20.68 | 4.291 | 2 | 2 | 2 | 8 | 4.2 |
| 6 | 23.92 | 3.716 | 0 | 4 | 0 | 6 | 0.7 |
| 7 | 26.11 | 3.411 | 1 | 3 | 3 | 24 | 10.7 |
| 8 | 26.80 | 3.324 | 0 | 4 | 2 | 24 | 7.9 |
| 9 | 29.41 | 3.035 | 2 | 4 | 2 | 24 | 18.2 |
| 10 | 31.23 | 2.861 | 1 | 5 | 1 | 24 | 42.7 |
| 11 | 31.23 | 2.861 | 3 | 3 | 3 | 8 | 9.7 |
| 12 | 34.08 | 2.628 | 0 | 4 | 4 | 12 | 100.0 |
| 13 | 35.69 | 2.513 | 1 | 5 | 3 | 48 | 5.8 |
| 14 | 36.22 | 2.478 | 0 | 6 | 0 | 6 | 0.7 |
| 15 | 36.22 | 2.478 | 2 | 4 | 4 | 24 | 26.5 |
| 16 | 38.25 | 2.351 | 0 | 6 | 2 | 24 | 27.3 |
| 17 | 39.72 | 2.268 | 3 | 5 | 3 | 24 | 1.6 |
| 18 | 40.19 | 2.242 | 2 | 6 | 2 | 24 | 16.5 |
| 19 | 42.06 | 2.146 | 4 | 4 | 4 | 8 | 20.8 |
| 20 | 43.42 | 2.082 | 1 | 5 | 5 | 24 | 1.4 |
| 21 | 43.42 | 2.082 | 1 | 7 | 1 | 24 | 1.9 |
| 22 | 43.87 | 2.062 | 0 | 6 | 4 | 24 | 2.0 |
| 23 | 45.61 | 1.987 | 2 | 6 | 4 | 48 | 9.5 |
| 24 | 46.89 | 1.936 | 1 | 7 | 3 | 48 | 3.6 |
| 25 | 46.89 | 1.936 | 3 | 5 | 5 | 24 | 2.7 |
| 26 | 48.96 | 1.859 | 0 | 8 | 0 | 6 | 7.6 |
| 27 | 50.17 | 1.817 | 3 | 7 | 3 | 24 | 2.9 |
| 28 | 50.57 | 1.803 | 0 | 8 | 2 | 24 | 2.1 |

FIG 1c

| nr. | pos. [°2θ] | d-distance [Å] | h | k | l | multiplicity | relative intensity [%] |
|---|---|---|---|---|---|---|---|
| 29 | 50.57 | 1.803 | 4 | 6 | 4 | 24 | 0.6 |
| 30 | 52.15 | 1.753 | 0 | 6 | 6 | 12 | 14.7 |
| 31 | 52.15 | 1.753 | 2 | 8 | 2 | 24 | 12.8 |
| 32 | 53.30 | 1.717 | 1 | 7 | 5 | 48 | 0.8 |
| 33 | 53.30 | 1.717 | 5 | 5 | 5 | 8 | 3.6 |
| 34 | 53.69 | 1.706 | 2 | 6 | 6 | 24 | 4.0 |
| 35 | 55.20 | 1.663 | 0 | 8 | 4 | 24 | 4.0 |
| 36 | 56.31 | 1.632 | 1 | 9 | 1 | 24 | 1.4 |
| 37 | 56.31 | 1.632 | 3 | 7 | 5 | 48 | 0.3 |
| 38 | 56.68 | 1.623 | 2 | 8 | 4 | 48 | 1.9 |
| 39 | 58.14 | 1.585 | 4 | 6 | 6 | 24 | 3.1 |
| 40 | 59.22 | 1.559 | 1 | 9 | 3 | 48 | 0.9 |
| 41 | 60.99 | 1.518 | 4 | 8 | 4 | 24 | 9.4 |
| 42 | 62.04 | 1.495 | 1 | 7 | 7 | 24 | 2.2 |
| 43 | 62.04 | 1.495 | 3 | 9 | 3 | 24 | 0.9 |
| 44 | 62.04 | 1.495 | 5 | 7 | 5 | 24 | 2.3 |
| 45 | 62.39 | 1.487 | 0 | 8 | 6 | 24 | 0.6 |
| 46 | 62.39 | 1.487 | 0 | 10 | 0 | 6 | 0.2 |
| 47 | 63.77 | 1.458 | 0 | 10 | 2 | 24 | 0.0 |
| 48 | 63.77 | 1.458 | 2 | 8 | 6 | 48 | 1.9 |
| 49 | 64.79 | 1.438 | 1 | 9 | 5 | 48 | 2.3 |
| 50 | 64.79 | 1.438 | 3 | 7 | 7 | 24 | 1.1 |
| 51 | 65.13 | 1.431 | 2 | 10 | 2 | 24 | 6.1 |
| 52 | 65.13 | 1.431 | 6 | 6 | 6 | 8 | 0.5 |
| 53 | 67.48 | 1.387 | 3 | 9 | 5 | 48 | 1.6 |
| 54 | 67.81 | 1.381 | 0 | 10 | 4 | 24 | 2.3 |
| 55 | 67.81 | 1.381 | 4 | 8 | 6 | 48 | 0.5 |
| 56 | 69.13 | 1.358 | 2 | 10 | 4 | 48 | 1.7 |

FIG 1d

| nr. | pos. [°2θ] | d-distance [Å] | h | k | l | multiplicity | relative intensity [%] |
|---|---|---|---|---|---|---|---|
| 57 | 70.12 | 1.341 | 1 | 11 | 1 | 24 | 0.2 |
| 58 | 70.12 | 1.341 | 5 | 7 | 7 | 24 | 0.1 |
| 59 | 71.74 | 1.315 | 0 | 8 | 8 | 12 | 10.6 |
| 60 | 72.71 | 1.299 | 1 | 9 | 7 | 48 | 0.1 |
| 61 | 72.71 | 1.299 | 1 | 11 | 3 | 48 | 0.2 |
| 62 | 72.71 | 1.299 | 5 | 9 | 5 | 24 | 1.3 |
| 63 | 73.03 | 1.295 | 2 | 8 | 8 | 24 | 2.0 |
| 64 | 73.03 | 1.295 | 4 | 10 | 4 | 24 | 2.1 |
| 65 | 74.31 | 1.275 | 0 | 10 | 6 | 24 | 0.0 |
| 66 | 74.31 | 1.275 | 6 | 8 | 6 | 24 | 1.7 |
| 67 | 75.27 | 1.262 | 3 | 9 | 7 | 48 | 0.2 |
| 68 | 75.27 | 1.262 | 3 | 11 | 3 | 24 | 0.3 |
| 69 | 75.58 | 1.257 | 2 | 10 | 6 | 48 | 1.7 |
| 70 | 76.85 | 1.239 | 0 | 12 | 0 | 6 | 1.1 |
| 71 | 76.85 | 1.239 | 4 | 8 | 8 | 24 | 0.1 |
| 72 | 77.80 | 1.227 | 1 | 11 | 5 | 48 | 1.2 |
| 73 | 77.80 | 1.227 | 7 | 7 | 7 | 8 | 0.1 |
| 74 | 78.11 | 1.223 | 0 | 12 | 2 | 24 | 0.0 |
| 75 | 79.36 | 1.206 | 2 | 12 | 2 | 24 | 1.7 |
| 76 | 79.36 | 1.206 | 4 | 10 | 6 | 48 | 0.8 |

FIG 2b

| | |
|---|---|
| sum formula | $Ca_{15.68}Ce_{0.32}Si_{17}N_{32.32}O_{1.68}$ |
| crystal system | cubic |
| space group | $F\bar{4}3m$ |
| lattice parameter / Å | a=14.875 |
| volume / Å$^3$ | 3291.6 |
| formula units per unit cell | Z=4 |
| radiation | Cu, $K_{\alpha 1}$, $\lambda$=1.5406 Å |
| temperature / K | 298 |
| measurement range / °2θ | 10-80 |
| structure-refinement | Rietveld-refinement |
| profile function | Pseudo-Voigt |
| underground function | polynomic |
| $R_{Bragg}$ | 7.88 |
| GoF | 1.30 |
| $R_{expected}/R_{profile}$ | 3.31/4.91 |
| $wR_{profile}$ | 4.31 |

FIG 2c

| atom | Wyckoff position | x | y | z | sof | $U_{iso}$ |
|---|---|---|---|---|---|---|
| Ca1 | 24f | 0.2128 | 0 | 0 | 1 | 0.006 |
| Ca2 | 24g | 0.4980 | 0.25 | 0.25 | 1 | 0.006 |
| Ca1 | 16e | 0.4167 | 0.4167 | 0.4167 | 1 | 0.006 |
| Si1 | 4a | 0 | 0 | 0 | 1 | 0.006 |
| Si2 | 16e | 0.1343 | 0.1343 | 0.1343 | 1 | 0.006 |
| Si3 | 16e | 0.3194 | 0.3194 | 0.3194 | 1 | 0.006 |
| Si4 | 16e | 0.6372 | 0.6372 | 0.6372 | 1 | 0.006 |
| Si5 | 16e | 0.8231 | 0.8231 | 0.8231 | 1 | 0.006 |
| N1 | 16e | 0.0681 | 0.0681 | 0.0681 | 1 | 0.006 |
| N2 | 48h | 0.1139 | 0.1139 | 0.1139 | 1 | 0.006 |
| N3 | 4c | 0.25 | 0.25 | 0.25 | 1 | 0.006 |
| N4 | 4d | 0.75 | 0.75 | 0.75 | 1 | 0.006 |
| N5 | 48h | 0.1146 | 0.1146 | 0.7479 | 1 | 0.006 |
| N6 | 16e | 0.5733 | 0.5733 | 0.5733 | 0.5 | 0.006 |
| O6 | 16e | 0.5733 | 0.5733 | 0.5733 | 0.5 | 0.006 |

| atom 1 | atom 2 | distance [Å] | number | atom 1 | atom 2 | distance [Å] | number |
|---|---|---|---|---|---|---|---|
| Ca1- | N2 | 2.449 | 2x | N1- | Si2 | 1.706 | 1x |
|  | N5 | 2.481 | 2x |  | Si1 | 1.755 | 1x |
|  | N1 | 2.585 | 2x |  | Ca1 | 2.585 | 3x |
| Ca2- | N2 | 2.621 | 4x | N2- | Si2 | 1.728 | 1x |
|  | N5 | 2.659 | 4x |  | Si3 | 1.771 | 1x |
| Ca3- | N6 | 2.340 | 3x |  | Ca1 | 2.449 | 1x |
|  | Si3 | 2.506 | 1x |  | Ca3 | 2.607 | 1x |
|  | N2 | 2.607 | 3x |  | Ca2 | 2.621 | 2x |
| Si1- | N1 | 1.755 | 4x | N3- | Si3 | 1.788 | 4x |
| Si2- | N1 | 1.706 | 1x | N4- | Si5 | 1.883 | 4x |
|  | N2 | 1.728 | 3x | N5- | Si4 | 1.714 | 1x |
| Si3- | N2 | 1.771 | 3x |  | Si5 | 1.723 | 1x |
|  | N3 | 1.788 | 1x |  | Ca1 | 2.481 | 1x |
| Si4- | N/O6 | 1.646 | 1x |  | Ca2 | 2.659 | 2x |
|  | N5 | 1.714 | 3x | N/O6- | Si4 | 1.646 | 1x |
| Si5- | N5 | 1.723 | 3x |  | Ca3 | 2.340 | 3x |
|  | N4 | 1.883 | 1x |  |  |  |  |

PHOSPHOR, METHOD FOR PRODUCING A PHOSPHOR AND USE OF A PHOSPHOR

The invention relates to a phosphor, a method for producing a phosphor and use of a phosphor.

This patent application claims the priority of the German patent application 102015110258.7, the disclosure of which is hereby incorporated by back reference.

In light-emitting devices, phosphors that emit red light play an important role. Many conversion LEDs (light-emitting diodes) contain at least one red-emitting phosphor. Devices with good color rendering, devices which emit warm white light and many display applications are dependent on the use of red-emitting phosphors. Nearly all red phosphors existing hitherto are based on europium or manganese as phosphor centers, for example $(Sr,Ca)_2AlSiN_3$:$Eu^{2+}$, or $K_2SiF_6$:$Mn^{4+}$. However, these phosphors have the disadvantage of very long decay times. Long decay times mean that following their excitation to an excited state, the phosphors revert only very slowly to the ground state with the emission of red radiation. In the case of high excitation energy, rapid saturation of the luminance thus occurs along with quenching effects, which reduce the efficiency of the phosphors. Compared with phosphors doped with europium or manganese, Ce-doped phosphors have comparatively short decay times. This results in a significantly slower saturation of the luminance and much higher efficiency of Ce-doped phosphors with high excitation energy. This makes them particularly interesting for applications in the high power range, thus applications with a power density of 1 W/mm$^2$ and over. However, up to now there have only been very few Ce-doped red-emitting phosphors.

According to the inventors' knowledge, Ce-doped red phosphors are not used in any application today. In addition, only few Ce-doped red solid phosphors are known in the literature. A phosphor of the formula $Lu_2CaMg_2(Si,Ge)_3O_{12}$:Ce is known, which emits light with an emission maximum of 605 nm (Setlur, A. A. et al., Chemical Materials 2006, 18, 3314 to 3322; U.S. Pat. No. 7,094,362 B2). A red-emitting phosphor of the formula $Sr_6(Y_{1-x}Ce_x)_2Al_4O_{15}$ ($0.1 \leq x \leq 0.2$) with an emission maximum of the emission radiation of around 600 nm is also known (Kawano Y. et al., Optical Materials Express 2014, 1770; DOI: 10.1364/OME.4.001770). Another known red-emitting phosphor follows the formula $CaSiN_2$:Ce and has an emission maximum of approx. 625 nm (R. Le Toquin et al., Chemical Physics Letters 2006, 423, 352 to 356).

The object of at least one embodiment of the present invention is to provide a phosphor that emits efficiently in the red spectral range. Another object consists in specifying a method for producing a phosphor and use of a phosphor for the conversion of light and use of a phosphor in light-emitting devices in the high power range.

The objects are achieved by a phosphor with the features of claim 1, by a method for producing a phosphor with the features of claim 9 and by the use of a phosphor.

A phosphor of the formula $AE_{16-x}Ce_xSi_{17-z}Al_zN_{32+y-z}O_{2-y+z}$ is specified. It is possible that the phosphor has other elements, for instance in the form of impurities, wherein these impurities, taken together, preferably have at most a weight proportion of the phosphor of at most 0.1 per mil or 10 ppm.

According to at least one embodiment, the constituent AE=Mg, Ca, Sr and/or Ba, preferably AE=Ca, Sr and/or Ba. AE can thus designate only Ca, for example, or also a mixture of Ca and Sr, Ca and Ba, for example.

In one embodiment the following applies: $0 \leq y \leq 5$ and $0 \leq z \leq 3$. Z describes the proportion of Al to which the lattice sites of Si are replaced by Al. Preferably $0 \leq z \leq 2$, particularly preferably $0 \leq z \leq 1$ applies.

In one embodiment $y+z<2$ applies. In this embodiment oxygen is thus a constituent of the phosphor.

In one embodiment Ce is present in the oxidation stage +3. Ce can also be described as an activator of the phosphor.

According to at least one embodiment, $0<x \leq 2$, preferably $0.0016<x \leq 1.6$ applies. X describes the proportion to which the lattice sites of AE are replaced by Ce. If, for example, x=0.0016 or x=1.6, 0.01 mol % or 10 mol % of AE are replaced by Ce in the phosphor. For example, x=0.16 or 0.32.

Due to the Ce doping, the phosphor has a very short decay time. This means that the reversion from an excited state to the ground state with the emission of radiation takes place within a few nanoseconds. It is thus possible to excite this phosphor with a radiation source that has a power density of over 1 W/mm$^2$ without rapid saturation of the luminance occurring. High luminance levels can thus be attained with the phosphor. For example, the decay times of manganese-doped phosphors are slower by around six orders of magnitude compared with this.

In one embodiment the phosphor has a cubic crystal system. The cubic crystal system has all space groups which have respectively a threefold axis of rotation or rotoinversion axis in four different directions.

In one embodiment the phosphor has the space group F $\bar{4}$ 3m.

In one embodiment the lattice constant a of the cubic crystal system of the phosphor is at a=14.7-15.1 Å, preferably a=14.8–15.0 Å, for example the lattice constant a is at 14.875 Å.

In one embodiment z=0. In this embodiment of the phosphor, Al is not a constituent of the phosphor. Thus a phosphor of the formula $AE_{16-x}Ce_xSi_{17}N_{32+y}O_{2-y}$ results. Due to the charge balance, y=x in this embodiment. It is possible that the phosphor in this embodiment has Al in the form of an impurity, for instance, wherein this impurity preferably has at most a weight proportion of the phosphor of a maximum of 0.1 per mil or 10 ppm.

In one embodiment the phosphor is configured to emit radiation in the red spectral range of the electromagnetic spectrum.

In one embodiment the phosphor has an emission maximum in the range from 630 nm to 680 nm, preferably 635 nm to 665 nm. The emission is thus in the deep red spectral range of the electromagnetic spectrum.

For devices such as LEDs with a high color rendering index and devices that emit warm white light and many display applications, phosphors are required that emit in the deep red spectral range. To date the choice of phosphors with deep red emission has been very small.

In one embodiment the phosphor has a dominant wavelength of $\lambda>580$ nm, preferably $\lambda>590$ nm. The dominant wavelength is the monochromatic wavelength that produces the same color impression as a polychromatic light source. In the CIE color space, the line that connects a point for a certain color and the point for the color of a light source can be extrapolated so that it meets the outline of the space at a maximum of two points. The point of intersection that lies closer to said color represents the dominant wavelength of the color as the wavelength of the pure spectral color at this point of intersection. The dominant wavelength is thus the wavelength that is perceived by the human eye. The dominant wavelength generally deviates from a wavelength of maximum intensity. In particular, the dominant wavelength lies in the red spectral range at smaller wavelengths than the wavelength of maximum intensity.

In one embodiment the phosphor can be excited by radiation in the UV range to yellow range of the electromagnetic spectrum. This means that the phosphor absorbs radiation in this wavelength range. Absorption is understood in this case in particular as the difference 1−reflection. The radiation with which the phosphor is excited or the radiation that is absorbed by the phosphor can also be described as primary radiation. For example, the phosphor can be excited by radiation with a wavelength of 400 nm to 600 nm, for example 550 nm.

On account of the short decay times of the phosphor, the primary radiation in one embodiment can have a high luminance and thus the radiation emitted by the phosphor, which can also be described as secondary radiation, can also have a high luminance. Conventional manganese- or europium-doped phosphors cannot attain such high levels of luminance of their secondary radiation, as these attain a saturation of the luminance very rapidly on account of the comparatively long decay times and are thus substantially less efficient at high excitation outputs. High luminance levels of the primary radiation can be attained by high power densities, for example of over 1 W/mm$^2$.

According to at least one embodiment, the phosphor has a spectral full width at half maximum, FWHM for short, of at least 115 nm. The full width at half maximum is 119 nm or 120 nm, for example.

The embodiments indicated of the phosphor can be produced according to the method specified below. Features of the phosphor are therefore disclosed for the method also and vice versa.

A method is specified for producing a phosphor. The phosphor has the formula $AE_{16-x}Ce_xSi_{17-z}Al_zN_{32+y-z}O_{2-y+z}$, wherein AE=Mg, Ca, Sr and/or Ba, $0<x\leq2$, $0\leq y\leq5$, $0\leq z\leq3$ and $y+z<2$. The method comprises the following method steps:

A) Mixing of the starting materials comprising an Mg, Ba, Sr, Al and/or Ca nitride, $Si_3N_4$, $CeO_2$, $SiO_2$ and/or an Mg, Ba, Sr and/or Ca oxide, B) Heating the mixture obtained in A) to a temperature over 1200° C., C) Annealing of the mixture at a temperature over 1200° C. for at least four hours to form an annealing cake, D) Cooling of the annealing cake to room temperature.

In particular, the method steps are performed in the stated order, thus beginning with method step A) and ending with method step D).

In one embodiment the heating in method step B) preferably takes place to a temperature over 1400° C., particularly preferably over 1500° C., for example at 1600° C. In this embodiment, the annealing in method step C) takes place at over 1400° C. or over 1500° C., for example at 1600° C.

In one embodiment the starting materials comprise $Mg_3N_2$, $Ca_3N_2$, $Sr_3N_2$ and/or $BaN_y$ with y=0.5-1 as Mg, Ca, Sr and/or Ba nitride.

In one embodiment the starting materials comprise $SiO_2$, MgO, CaO, SrO and/or BaO. MgO, CaO, SrO and BaO correspond in this embodiment to the Mg, Ba, Sr and Ca oxide.

In one embodiment of the method, the starting materials comprise $Ca_3N_2$, $Si_3N_4$, $CeO_2$ and CaO or consist of these compounds.

In one embodiment the starting materials are present as powder.

According to at least one embodiment the starting materials are mixed in a ball mill or in a tumble mixer. Grinding can also take place at the same time. For example, $ZrO_2$ balls can be present in a ball mill. The mixing or the mixing and grinding can take place as dry mixing/dry grinding, for example, thus free of water.

In one embodiment the method steps A) to D) are executed in a nitrogen atmosphere. For example, method step A) is carried out in a glovebox in an $N_2$ inert gas atmosphere. The method steps B) to D) are carried out in a nitrogen atmosphere, wherein the nitrogen atmosphere has a reducing effect at temperatures over 1200° C. Thus in method step C) or B) and C), $Ce^{4+}$ of the $CeO_2$ is reduced to $Ce^{3+}$.

The annealing in method step C) can take place for two hours to ten hours, preferably for four hours to six hours, for example for four hours.

In one embodiment the proportion of oxygen in the starting materials is 2 mol % to 20 mol %, preferably 12 mol % to 15 mol %, particularly preferably 12 mol % to 13 mol % in relation to the total quantity of nitrogen and oxygen in the starting materials. It has been shown that the yield of the phosphor is maximal above 12 mol % oxygen in relation to the total quantity of nitrogen and oxygen in the starting materials. In particular, this means that no secondary phases or scarcely any secondary phases are formed and the starting materials are converted completely or virtually completely. Below 2 mol % no formation of the phosphor is to be observed.

In one embodiment the starting materials for AE, Ce, Si and Al are used in a mole ratio to one another that corresponds to the stoichiometric composition in the molecular formula of the phosphor to be produced. It is possible that the component AE is weighed out with an excess to compensate for any losses occurring during the synthesis, for example due to evaporation or any impurities of the starting materials. For example, CaO is weighed out with an excess, as it is often contaminated by $CaCO_3$ and/or $Ca(OH)_2$, for example.

In one embodiment an excess of oxygen is used in the starting materials on account of the reducing atmosphere. This means that the starting materials contain more oxygen than the phosphor to be produced according to its molecular formula.

In one embodiment the starting materials comprise AlN.

In one embodiment of the method the starting materials consist of an Mg, Ba, Sr and/or Ca nitride, $Si_3N_4$, AlN, $CeO_2$, $SiO_2$ and/or an Mg, Ba, Sr and/or Ca oxide.

In one embodiment the starting materials have a mole ratio of Mg, Ba, Sr and/or Ca:Si:Al:Ce:O of 16−x:17−z:z:x:(2−y+z)b, wherein b>1. Compared to its incorporation into the crystal lattice of the phosphor, oxygen is thus added to the starting materials in excess. It is also possible that Mg, Ba, Sr and/or Ca are added in excess.

In one embodiment the starting materials consist of an Mg, Ba, Sr and/or Ca nitride, $Si_3N_4$, $CeO_2$, $SiO_2$ and/or an Mg, Ba, Sr and/or Ca oxide.

In one embodiment the starting materials have a mole ratio of Mg, Ba, Sr and/or Ca:Si:Ce:O of 16-x:17:x:(2−y)b, wherein b>1 and x=y. It is also possible that Mg, Ba, Sr and/or Ca are added in excess.

In one embodiment, following method step D) another method step takes place: E) Crushing of the annealing cake. Here the annealing cake can be ground and screened until the desired particle size for a corresponding application is achieved.

In one embodiment, following method step D) or E) another method step takes place:

F) Annealing of the phosphor arising in method step D) or E). The annealing takes place in particular at a temperature of at least 1200° C., preferably of at least 1400° C. and preferably in a nitrogen atmosphere. The annealing can take place for two hours to ten hours, preferably for three hours to six hours, for example for four hours. In particular, method step F) is connected to heating to a temperature over 1200° C. before method step F) and to cooling of the annealing cake to room temperature after method step F). In particular, method step F) takes place if the desired quality of the phosphor has not yet been attained after method step D) or E).

In one embodiment, following method step F) is another method step E): Crushing of the annealing cake.

In one embodiment the heating takes place at a heating rate of 150 to 300° C. per hour, preferably of 200 to 250° C. per hour, for example at a heating rate of 250° C. per hour.

In one embodiment the cooling takes place at a cooling rate of 150 to 300° C. per hour, preferably of 150 to 200° C. per hour, for example at a cooling rate of 250° C. per hour.

The indicated embodiments of the phosphor can be used for the uses cited below. Features of the phosphor and of the method are therefore also disclosed for the use and vice versa.

The use of a phosphor of the formula $AE_{16-x}Ce_xSi_{17-z}Al_zN_{32+y-z}O_{2-y+z}$ for the conversion of light into red light of a longer wavelength. It is to be understood by this that light is absorbed by the phosphor and is emitted as light with a longer wavelength, which lies in the red spectral range of the electromagnetic spectrum.

In one embodiment of the use, the phosphor is used to convert UV light to yellow light into longer-wavelength red light. For example, the UV to yellow light has a wavelength of 400 to 600 nm, for example 550 nm.

The use of a phosphor in a light-emitting device is specified.

In one embodiment the light-emitting device has an electric power density of 1 W/mm$^2$ and above.

In one embodiment of the use, the light-emitting device can comprise one or more laser diodes. The at least one laser diode is configured to produce laser radiation in operation of the light-emitting device. The laser radiation can have a radiation density of at least 1 W/mm$^2$.

A use of red phosphors in light-emitting devices with one or more laser diodes did not lead previously to the desired efficiency. For example, the phosphor $(Ba,Ca,Sr)_2Si_5N_8$:Eu is not suitable for the production of high luminance levels. For this reason a yellow phosphor, such as $Y_3Al_5O_{12}$:Ce, for example, is normally used in conjunction with a longpass filter to obtain a red emission. Since the phosphor according to the invention has an emission displaced into the red spectral range in comparison with $Y_3Al_5O_{12}$:Ce, the efficiency of the light-emitting device can be increased considerably.

In one embodiment of the use, the light-emitting device can comprise one or more light-emitting diodes. The at least one light-emitting diode is configured for the production of primary radiation in operation of the light-emitting device. The primary radiation can have a radiation density of at least 1 W/mm$^2$.

In particular, the at least one laser diode or the at least one light-emitting diode has a semiconductor layer sequence.

In one embodiment of the use, the phosphor is part of a conversion element. In particular, the conversion element is arranged in the beam path of the at least one laser diode or the at least one light-emitting diode.

In one embodiment the conversion element is arranged directly on the at least one light-emitting diode or at a distance from the at least one light-emitting diode.

In one embodiment the phosphor or the conversion element is arranged at a distance from the at least one laser diode (LARP; "laser activated remote phosphor"). Such LARP applications are known, for example, from the PCT applications WO 2012/076296 A2, WO 2011/098164 A1 and WO 2013/110495 A2, to which reference is made hereby to the complete content. Substantially higher luminance levels can be realized with such lighting devices, for example projectors, than with conventional radiation sources.

In one embodiment of the use, the light-emitting device is configured for the emission of light that creates the impression of a white-colored light for the observer. To this end the conversion element comprises one or more other phosphors, which emit green and/or yellow light. For example, the light-emitting diode emits blue light. The light radiated by the lighting device is then a white mixed light, composed of blue, red and yellow or green light.

In one embodiment of the use, the light-emitting device emits warm white light. Warm white light means that the light has a color temperature below 4000 K.

Due to the rapid saturation of the luminance, conventional Mn-or Eu-doped phosphors are not suitable for use in light-emitting devices with high power densities above 1 W/mm2, as they lose efficiency in these ranges and thus the color temperature of the mixed light changes.

Further advantageous embodiments and developments of the invention result from the exemplary embodiments described below in connection with the figures.

Figure 2A:
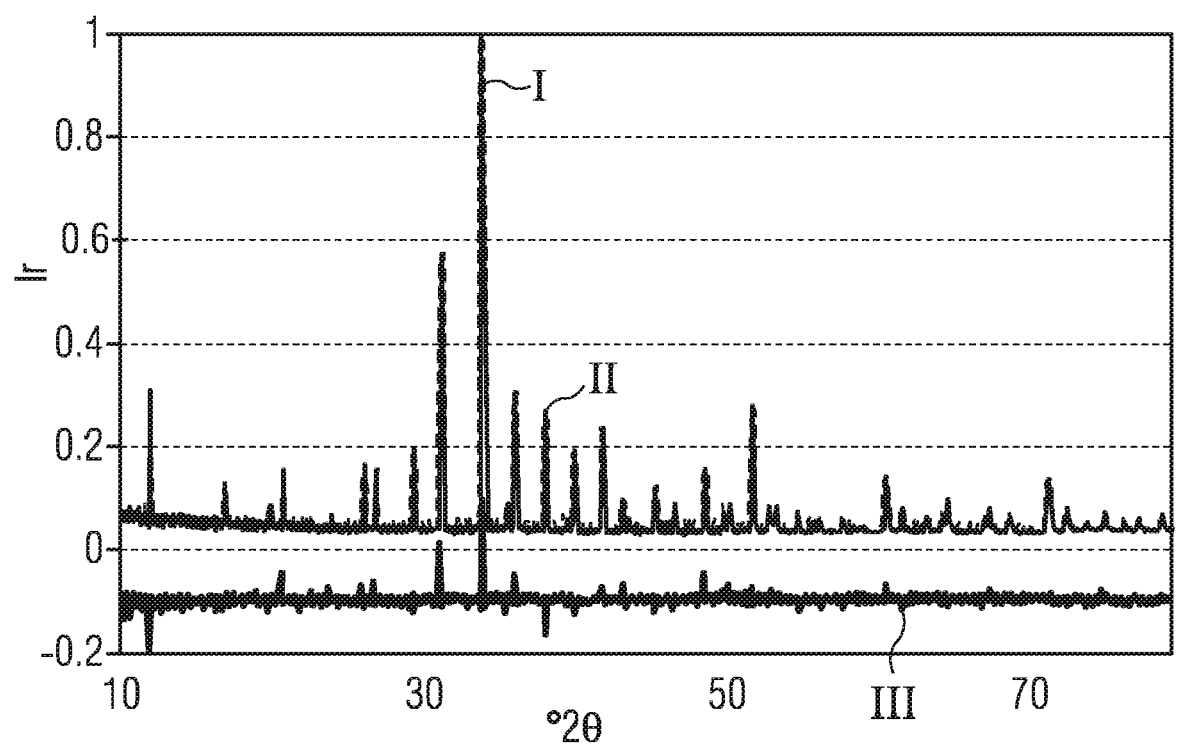
Figures 2D, 2E:
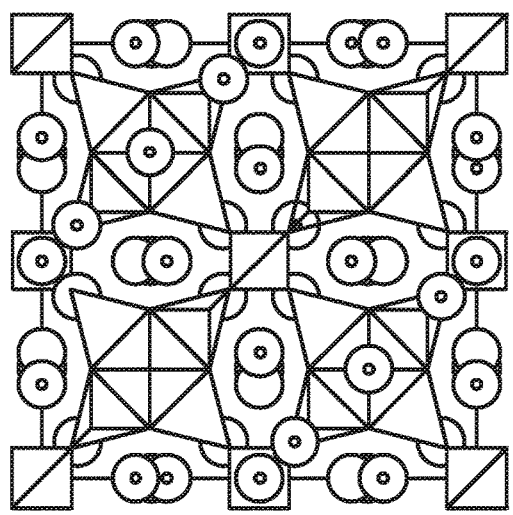
Figure 3A:
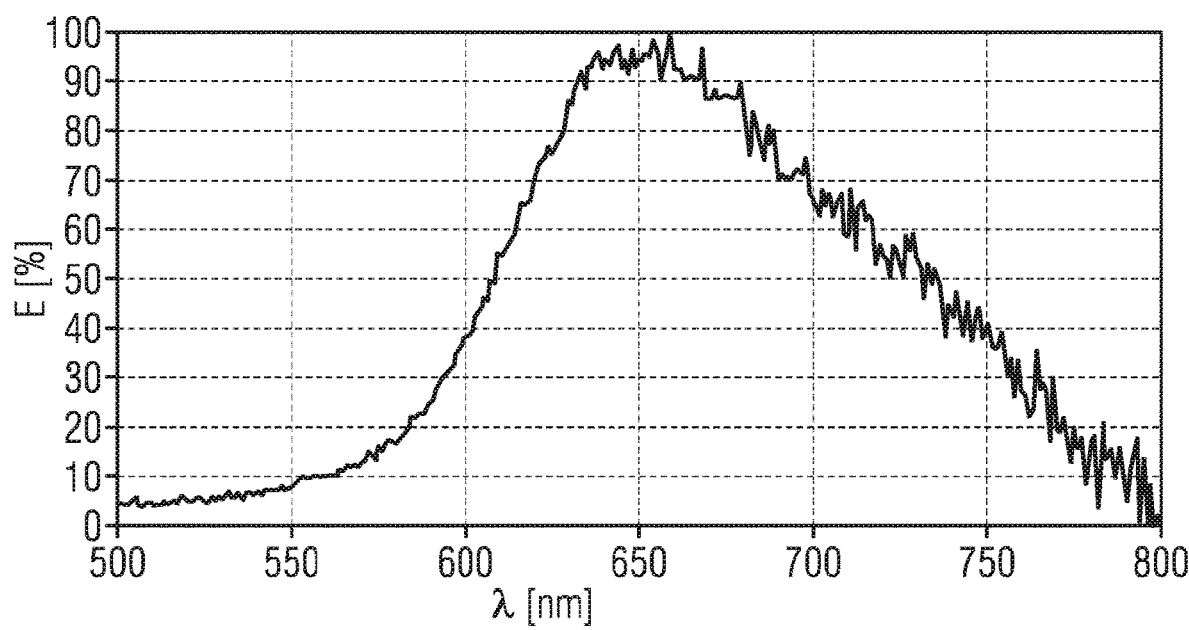
Figure 3B:
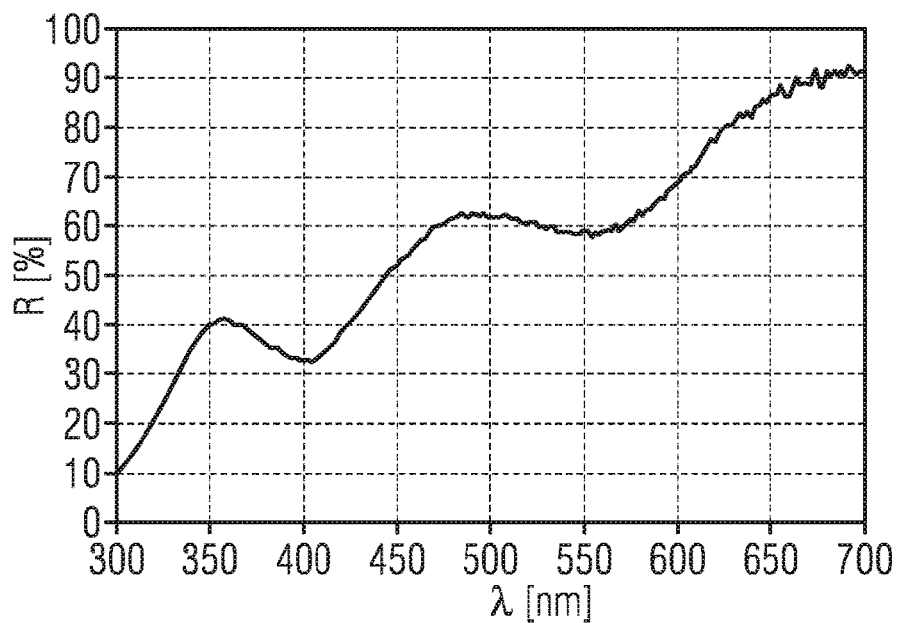
Figure 4:
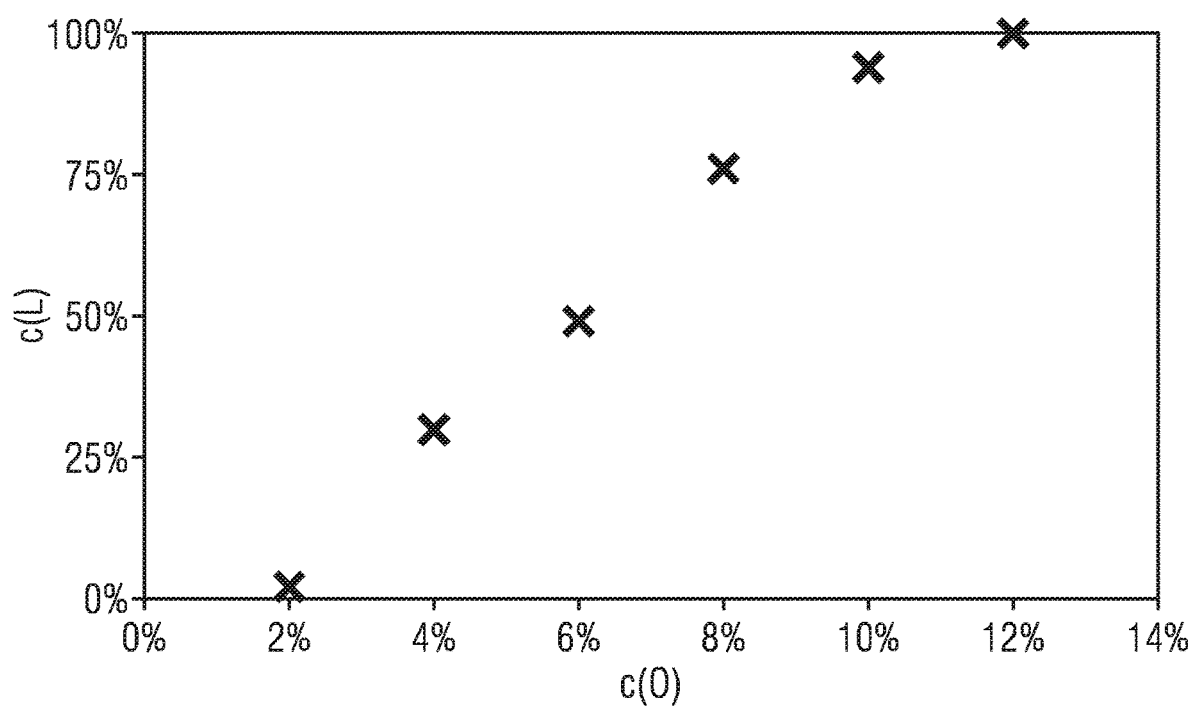

FIG. 1a shows the measured X-ray diffraction powder diffractogram of a phosphor described here, FIGS. 1b to 1d shows the data of the X-ray diffraction powder diffractogram shown in FIG. 1a, FIG. 2a shows a measured X-ray diffraction powder diffractogram of a phosphor described here, an X-ray diffraction powder diffractogram calculated according to the Rietveld method and their difference, FIGS. 2b to 2d show crystallographic data of a phosphor described here, FIG. 2e shows a schematic representation of the cubic crystal structure of a phosphor described here, FIG. 3a shows the emission spectrum of a phosphor described here, FIG. 3b shows the degree of reflection of a phosphor described here, FIG. 4 shows the dependence of the formation of a phosphor described here on the oxygen content of the starting materials.

In FIG. 1a the X-ray diffraction powder diffractogram of the phosphor $Ca_{15.84}Ce_{0.16}Si_{17}N_{32.16}O_{1.84}$ using copper $K_{\alpha 1}$ radiation is indicated. On the x-axis the diffraction angles are indicated in °2θ values and on the y-axis the relative intensity ($I_r$) is shown.

The phosphor $Ca_{15.68}Ce_{0.32}Si_{17}N_{32.32}O_{1.68}$, which has the X-ray diffraction powder diffractogram shown in FIG. 1a, was produced as follows: 23.275 g $Ca_3N_2$, 28.236 g $Si_3N_4$, 1.039 g $CeO_2$ and 7.45 g CaO are ground in powder form in a ball mill with the addition of $ZrO_2$ balls in a glovebox (atmosphere: N2, [O]<1 ppm, [H2O]<1 ppm) for six hours. The mole ratio of Ca:Ce:Si:O of the starting materials is 17.03:0.16:17:4.09. O is present in the starting materials at 13 mol % in relation to the total quantity of N in the starting materials and at 12 mol % relative to the 34 lattice sites available for N and O in the crystal lattice. O is present in the starting materials at 12 mol % in relation to the total quantity of N and O in the starting materials. The homogeneous mixture is transferred to a tungsten crucible, which is transferred to a tube furnace. The mixture is heated in a nitrogen atmosphere at a heating rate of 250° C. per hour to a temperature of 1600° C. The mixture is annealed for 4 hours at a temperature of 1600° C., then cooling takes place to room temperature at a cooling rate of 250° C. per hour. The pink-colored product is ground in an Achat mortar grinder. Then the phosphor is characterized.

In the table in FIGS. $1b$ to $1d$, the data of the X-ray diffraction powder diffractogram shown in FIG. $1a$ is listed. d describes the lattice plane distance and hkl the Miller indices in the table.

In FIG. $2a$ the diffraction angles are indicated in $°2\theta$ values on the x-axis and the relative intensity (Ir) is plotted on the y-axis. The curve provided with the reference sign I shows a measured X-ray diffraction powder diffractogram and corresponds to that of the phosphor $Ca_{15.84}Ce_{0.16}Si_{17}N_{32.16}O_{1.84}$, the X-ray diffraction powder diffractogram of which is already shown in FIG. $1a$. The X-ray diffraction powder diffractogram I that is obtained was analyzed by means of a Riedveld analysis. In a Riedveld method the crystal structure is varied until the diffractogram calculated from it best coincides with the measured diffractogram. The structure of $Ca_{16}Si_{17}N_{34}$ was used as a basis for the Riedveld method. According to Hick et al., Inorganic Chemistry 2012, 51, 12626, $Ca_{16}Si_{17}N_{34}$ has a cubic crystal structure with a lattice constant a=14.888 Å and belongs to the space group F $\bar{4}$ 3m. The diagram provided with the reference sign II corresponds to the calculated X-ray diffraction powder diffractogram for the phosphor $Ca_{15.84}Ce_{0.16}Si_{17}N_{32.16}O_{1.84}$. The diagram provided with the reference sign III shows the difference between the X-ray diffraction powder diffractogram with the reference sign I and the calculated diagram with the reference sign II. As is apparent, the correspondence between the measured X-ray diffraction powder diffractogram with the reference sign I and the calculated diagram with the reference sign II is very high.

The data of the Rietveld refinement and the most important crystallographic data of the phosphor $Ca_{15.84}Ce_{0.16}Si_{17}N_{32.16}O_{1.84}$ are shown in the tables in FIGS. $2b$ to $2d$.

FIG. $2e$ shows the cubic crystal structure of the phosphor $Ca_{15.84}Ce_{0.16}Si_{17}N_{32.16}O_{1.84}$ in a schematic representation. The phosphor crystallizes cubically in the space group F $\bar{4}$ 3m. The structure of the phosphor was determined with reference to the X-ray diffraction powder diffractogram by the Rietveld analysis. A unit cell consists of eight clusters, which are each constructed of eight edge-linked $SiN_4$ tetrahedra. The sites of the N in the tetrahedra are partly replaced by O. In FIG. $3a$, four of these clusters are shown. Four of the clusters are freestanding, the other four clusters are linked via corner linking to central $SiN_4$ tetrahedra on the centers of the surface of the unit cell to a three-dimensional space network.

In FIG. $3a$ the emission spectrum of the phosphor $Ca_{15.68}Ce_{0.32}Si_{17}N_{32.32}O_{1.68}$ is depicted. The wavelength in nanometers is plotted on the x-axis and the emission intensity in percent on the y-axis. The phosphor has a full width at half maximum of about 120 nm and a dominant wavelength of over 590 nm, the maximum of the emission is at approximately 650 nm.

FIG. $3b$ shows the degree of reflection of the phosphor $Ca_{15.68}Ce_{0.32}Si_{17}N_{32.32}O_{1.68}$ as a function of the wavelength. The wavelength in nanometers is plotted on the x-axis and the degree of reflection in percent on the y-axis. As is evident, the phosphor according to the invention can be excited with a wavelength of between 350 and 550 nm, since the reflection here is relatively low and the absorption is particularly high.

FIG. 4 shows the dependence of the formation of the phosphor of the general formula $Ca_{16-x}Ce_xSi_{17}N_{32+x}O_{2-x}$ with x=0.16 in cubic crystal structure in the space group F $\bar{4}$ 3m as a function of the oxygen content of the starting materials. Plotted on the x-axis is the oxygen content (c(O)) of the starting materials $CeO_2$ and CaO in mole percent in relation to the total quantity of nitrogen and oxygen in the starting materials and on the y-axis the proportion of the phosphor $Ca_{16-x}Ce_xSi_{17}N_{32+x}O_2$, arising with x=0.16 in cubic crystal structure in the space group F $\bar{4}$ 3m (c(L)) in percent. As is evident, the phosphor is formed 100% or nearly 100% if oxygen at 12 mol % in relation to the total quantity of nitrogen and oxygen is weighed out in the starting materials. If the proportion of oxygen is 1%, the phosphor does not form. In the range between 0% and about 12%, orthorhombic phases of $CaSiN_2$:Ce form in addition to the target phase. Thus it is shown that the presence of oxygen in the starting materials is essential for the formation of the phosphor with the general formula $AE_{16-x}Ce_xSi_{17-z}Al_zN_{32+y-z}O_{2-y+z}$ with AE=Mg, Ca, Sr and/or Ba, 0<x≤2, 0≤y<5, 0≤z≤3 and y+z<2.

The invention is not restricted by the description with reference to the exemplary embodiments to these. On the contrary, the invention comprises every new feature as well as every combination of features, which includes in particular every combination of features in the Claims, even if this feature or this combination is not itself explicitly specified in the Claims or exemplary embodiments.

REFERENCE SIGN LIST

Ir Relative intensity
d Lattice plane distance
hkl Miller indices
I, II, X-ray diffraction powder diffractogram
III Difference between X-ray diffraction powder diffractogram I and II
λ Wavelength
nm Nanometer
E Emission intensity
R Degree of reflection
c(O) Oxygen content
c(L) Proportion of phosphor arising

The invention claimed is:

1. Phosphor of the formula $AE_{16-x}Ce_xSi_{17-z}Al_zN_{32+y-z}O_{2-y+z}$ with AE=Mg, Ca, Sr and/or Ba, 0<x≤2, 0≤y<5, 0≤z≤3 and y+z<8, wherein the phosphor has a cubic crystal system with the space group F $\bar{4}$ 3m.

2. Phosphor according to claim 1, wherein the lattice constant a is at a=14.7–15.1 Å.

3. Phosphor according to claim 1, wherein 0.0016<x≤1.6.

4. Phosphor according to claim 1, wherein z=0 and y=x.

5. Phosphor according to claim 1, which is configured to emit radiation in the red spectral range of the electromagnetic spectrum.

6. Phosphor according to claim 1, which has an emission maximum in the range from 630 nm to 680 nm.

7. Method for producing a phosphor of the formula $AE_{16-x}Ce_xSi_{17-z}Al_zN_{32+y-z}O_{2-y+z}$, with AE=Mg, Ca, Sr and/or Ba, $0<x\leq2$, $0\leq y<5$, $0\leq z\leq3$ and $y+z<8$, wherein the phosphor is configured to emit radiation in the red spectral range of the electromagnetic spectrum, comprising the method steps

- A) Mixing of the starting materials comprising an Mg, Ba, Sr and/or Ca nitride, $Si_3N_4$, $CeO_2$, $SiO_2$ and/or an Mg, Ba, Sr, Al and/or Ca oxide, wherein the proportion of oxygen in the starting materials is 2 mol % to 20 mol % in relation to the total quantity of nitrogen and oxygen in the starting materials,
- B) Heating of the mixture obtained in A) to a temperature over 1200° C.,
- C) Annealing of the mixture at a temperature over 1200° C. for at least 4 hours,
- D) Cooling of the mixture to room temperature.

8. Method according to claim 7, wherein the method steps A) to D) are executed in a nitrogen atmosphere.

9. Method according to claim 7, wherein the starting materials in method step A) comprise AlN.

* * * * *